(12) United States Patent
Jacob, III (10) Patent No.: US 11,673,379 B2
(45) Date of Patent: *Jun. 13, 2023

(54) HEAT SEALABLE THERMO-PRINTABLE TAPE

(71) Applicant: TAJ TECH LLC, Romeo, MI (US)

(72) Inventor: Theodore A. Jacob, III, Romeo, MI (US)

(73) Assignee: TAJ TECH LLC, Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,827

(22) Filed: Jul. 12, 2021

(65) Prior Publication Data

US 2021/0339512 A1 Nov. 4, 2021

Related U.S. Application Data

(63) Continuation of application No. 16/057,391, filed on Aug. 7, 2018, now Pat. No. 11,090,912.

(51) Int. Cl.
   *B32B 27/12* (2006.01)
   *B32B 5/02* (2006.01)
   (Continued)

(52) U.S. Cl.
   CPC ............. *B32B 27/12* (2013.01); *B32B 5/028* (2013.01); *B32B 27/40* (2013.01); *B32B 37/153* (2013.01);
   (Continued)

(58) Field of Classification Search
   CPC ......... B32B 27/06; B32B 27/12; B32B 27/40; B32B 3/26; B32B 3/263; B32B 3/266;
   (Continued)

(56) References Cited

U.S. PATENT DOCUMENTS 5,030,498 A * 7/1991 Okada ..................... B32B 27/36
428/196
5,215,814 A 6/1993 Gager et al.
(Continued)

FOREIGN PATENT DOCUMENTS

CN        201378390        1/2010
CN        201378390 Y  *  1/2010
(Continued)

OTHER PUBLICATIONS

Extended Search Report dated Aug. 28, 2019 for EP 19151885.1, 11 pgs.
(Continued)

*Primary Examiner* — Megha M Gaitonde
(74) *Attorney, Agent, or Firm* — Brooks Kushman P.C.

(57) ABSTRACT

A heat-sealable thermoprintable tape includes an extruded thermoplastic coating having a smooth printable surface on a first side, and an extruded heat-seal polymer layer disposed on a second side of the extruded thermoplastic coating, opposite the first side. The extruded thermoplastic coating is bonded to the heat-seal polymer layer to form the heat-sealable thermoprintable tape. A method of forming a heat-sealable thermoprintable tape includes providing a support layer having an open structure configured to support an extruded coating, applying a polyurethane coating onto a first side of the support layer and into open spaces of the open structure to form a top surface, and extruding a heat-sealable polymer onto a second side of the support layer opposite the first side and into the open spaces of the open structure. The polyurethane coating bonds to the heat-sealable polymer within the open structure of the support layer.

19 Claims, 3 Drawing Sheets

(51) Int. Cl.
*B32B 27/40* (2006.01)
*B32B 37/15* (2006.01)
*B32B 38/00* (2006.01)

(52) U.S. Cl.
CPC ........ *B32B 38/145* (2013.01); *B32B 2255/02* (2013.01); *B32B 2255/26* (2013.01); *B32B 2262/0276* (2013.01); *B32B 2307/536* (2013.01); *B32B 2307/538* (2013.01)

(58) Field of Classification Search
CPC ......... B32B 5/024; B32B 5/026; B32B 5/028; B32B 5/28; B32B 37/15; B32B 37/153; B32B 38/145; B32B 2255/02; B32B 2255/26; B32B 2255/28; B32B 2262/0276; B32B 2307/536; B32B 2307/538; B32B 2375/00; B32B 2305/38; B32B 2307/75; B32B 2405/00; B32B 2519/00; Y10T 428/24008; Y10T 428/24273; Y10T 428/24322; Y10T 428/24479; Y10T 428/24496; Y10T 428/24521; Y10T 428/24529; Y10T 428/24537; Y10T 428/2457; Y10T 428/24612; Y10T 442/172; Y10T 442/176; Y10T 442/178; Y10T 442/183; Y10T 442/191; Y10T 442/198; Y10T 442/10; Y10T 442/164; Y10T 442/174; B03D 9/00; D03D 19/00; B41M 5/502–508; B41M 5/52
USPC ..... 442/2, 38, 43, 44, 45, 46–47, 49, 64–75; 428/99, 131, 137, 156, 161, 162, 163, 428/167, 172, 32.39–32.87
See application file for complete search history.

(56) References Cited

U.S. PATENT DOCUMENTS

| | | |
|---|---|---|
| 5,240,767 A | 8/1993 | Umezu et al. |
| 5,413,841 A | 5/1995 | Mahn, Sr. et al. |
| 5,508,105 A | 4/1996 | Orensteen et al. |
| 5,584,800 A | 12/1996 | Scholz et al. |
| 5,658,647 A | 8/1997 | Magill et al. |
| 6,444,305 B2 | 9/2002 | Banovetz et al. |
| 6,586,520 B1 | 7/2003 | Canorro et al. |
| 6,849,338 B2 | 2/2005 | Clemens et al. |
| 6,852,399 B2 | 2/2005 | Takahashi et al. |
| 7,491,663 B2 * | 2/2009 | Perillon .................. D06N 3/06 442/67 |
| 7,543,843 B2 | 6/2009 | Keshavaraj et al. |
| 7,691,225 B2 | 4/2010 | Kishimoto et al. |
| 7,811,647 B2 | 12/2010 | Arimitsu et al. |
| 7,910,163 B2 | 3/2011 | Zollner et al. |
| 7,935,383 B2 | 5/2011 | Zollner et al. |
| 2002/0005434 A1 | 1/2002 | Murakami et al. |
| 2005/0282449 A1 | 12/2005 | Mehta et al. |
| 2008/0261014 A1 | 10/2008 | McGuire et al. |
| 2015/0133014 A1 | 5/2015 | Traser et al. |
| 2016/0318289 A1 | 3/2016 | Bunger et al. |
| 2017/0036429 A1 | 9/2017 | Hartmann et al. |
| 2021/0115306 A1 * | 4/2021 | Raeymackers ........... B32B 5/02 |

FOREIGN PATENT DOCUMENTS

| | | |
|---|---|---|
| DE | 102015012015 | 2/2017 |
| WO | 9304855 | 3/1993 |
| WO | WO-2018136653 A1 * | 7/2018 ............ A61F 13/023 |

OTHER PUBLICATIONS

International Search Report for PCT Application No. PCT/US22/016199 dated Jun. 16, 2022, 5 pages.

* cited by examiner

HEAT SEALABLE THERMO-PRINTABLE TAPE

CROSS-REFERENCE

This application is a continuation of U.S. application Ser. No. 16/057,391, filed Aug. 7, 2018, now U.S. Pat. No. 11,090,912, issued Aug. 17, 2021, the disclosure of which is hereby incorporated in its entirety by reference herein.

TECHNICAL FIELD

The present disclosure relates to an extrudable tape, and more particularly, an extrudable tape with a smooth printing surface.

BACKGROUND

Thermoprintable tapes are used for labeling and tagging industrial garments, uniforms, hunting gear, shoes and boots, and other applications. Thermoprintable tapes are typically in the form of a flexible ribbon, and can have identifiers printed on for application to individual garments. Conventional thermoprintable tapes are prepared using a tight weave or high-count fabric, such as a woven nylon or polyester fabric, which is heat set and pre-calendared close to the weave for induction on a coating line. The tight weave (e.g., 90×64) or high-count fabrics may be polyesters of various weights (e.g., 1.2 oz/yd$^2$ to 2 oz/yd$^2$). A base coating, such as a two-component system including an aromatic urethane in a solution such as toluene or methyl ethyl ketone, is applied to the woven fabric, and smoothed by a floating knife or a knife over roll. The base coating is conventionally a solvent based thermoplastic polyurethane (TPU) polymer, aromatic in nature, compounded with pigments, cross-linkers, or both, which is film forming on a tightly knit fabric when the solvent is evaporated. The base coating is then dried and cured, evaporating the solvents and forming a solid film on the woven fabric substrate which does not fall through the tight knit fabric, but may include the contours of the weave on the surface. A top coating is then applied to the base coating. The top coating is also conventionally solvent-based and aliphatic in nature to protect against yellowing, and may require further mechanical treatment to smooth the surface. After the base coat and top coat have been applied, conventional thermoprintable tapes require application of a heat seal coating to the back of the tape. The tape with the heat seal coating is then post-calendared to smooth the surface of the tape.

In conventional tapes, the thermoprintable tape with a woven nylon or polyester fabric may have a propensity to curl after washing, and, in the case of nylons, may not adhere to polyester fabric and may be susceptible to moisture. Furthermore, in conventional methods, the film formed by the base coating may be susceptible to heat, requiring requires cross-linkers (e.g., triisocyanate), which may not be solvent-resistant, to become heat resistant, thus making washing and drying difficult.

Additionally, conventional thermoprintable tapes typically may have a surface that follows the contours of the weave of the woven fabric after the solvents are evaporated, thus resulting in difficulty achieving high resolution thermoprinting without additional or special processing to make the surface smoother. When the surface includes the contours of the weave, the printed matter may be discontinuous, e.g. a printed bar code may be unreadable, and smaller prints may be overwhelmed by the irregularity of the surface texture. The printing surface follows the pattern of the woven fabric even with multiple layers of base coatings or top coating are applied, as the woven fabric will still have a contour pattern in each subsequent layer, and the layers contribute to the defects in the printing surface. Additives such as expanding solids and dispersible solids are conventionally used to improve surface area for printing, but the surface may still need calendaring for a smooth printing surface, as well as further processing by solvents to remove the solids. Furthermore, multiple calendaring may be used on multiple coated layers, but a smooth surface is difficult to achieve without pre-calendaring and post-calendaring the layers, and may increase product processing time.

SUMMARY

According to at least one embodiment, a heat-sealable thermoprintable tape includes an extruded thermoplastic coating having a smooth printable surface on a first side, and an extruded heat-seal polymer layer disposed on a second side of the extruded thermoplastic coating, opposite the first side. The extruded thermoplastic coating is bonded to the heat-seal polymer layer to form the heat-sealable thermoprintable tape.

According to one or more embodiments, the smooth printable surface may have a surface roughness of at most 50 μm as measured by a profilometer. In at least one embodiment, the smooth printable surface may have a surface roughness of 10 to 40 μm as measured by a profilometer. According to at least one embodiment, the extruded thermoplastic coating may have a Shore Hardness of 45 to 98 A. In an embodiment, the heat-sealable thermoprintable tape may further include a support layer between the extruded thermoplastic coating and the extruded heat-seal polymer layer, the support layer having an open structure, wherein the extruded thermoplastic coating and heat-seal polymer may be bonded within the open structure of the support layer. In one or more embodiments, the support layer may be a scrim, a permeable sheet, a spun fabric, or a woven layer. Further, the scrim may be a scrim having a thread count of 150 to 200. In an embodiment, the scrim may be a polyester scrim. In one or more embodiments, the extruded thermoplastic coating may be 1 to 5 mm thick, and the heat-seal polymer layer may be 1 to 5 mm thick. According to one or more embodiments, the extruded thermoplastic coating may be a thermoplastic polyurethane coating. In certain embodiments, the extruded thermoplastic coating and the extruded heat-seal polymer may be the same polyurethane material. In some embodiments, the heat-sealable thermoprintable tape may further include an aliphatic polycarbonate polyurethane top coat layer disposed on the first side of the extruded thermoplastic coating.

According to at least one embodiment, a method of forming a heat-sealable thermoprintable tape includes providing a support layer having an open structure configured to support an extruded coating, applying a polyurethane coating onto a first side of the support layer and into open spaces of the open structure to form a top surface, and extruding a heat-sealable polymer onto a second side of the support layer opposite the first side and into the open spaces of the open structure. The polyurethane coating bonds to the heat-sealable polymer within the open structure of the support layer.

According to one or more embodiments, the top surface may have a surface roughness of at most 50 μm as measured by a profilometer. In an embodiment, applying the polyurethane coating may include reverse-roll printing the polyurethane coating. In one or more embodiments, the open structure of the support layer may be defined by a void content of 10 to 50% by volume. In one or more embodiments, the method may further include applying an aliphatic polycarbonate coating to the top surface of the polyurethane coating by reverse-rolling to form a printable surface.

According to at least one embodiment, a method of forming a heat-sealable thermoprintable tape includes applying a heat-sealable polymer to a support layer to form a first composite, applying an aliphatic polycarbonate polyurethane coating to a releasable paper, applying a polyurethane coating on to the aliphatic polycarbonate polyurethane coating on the releasable paper to form a second composite; and bonding the heat-sealable polymer of the first composite to the polyurethane coating of the second composite within the support layer with heat and pressure to form the heat-sealable thermoprintable tape having a printable surface on the aliphatic polycarbonate polyurethane coating.

According to one or more embodiments, applying the aliphatic polycarbonate polyurethane coating to the releasable paper may include reverse-roll printing. In certain embodiments, applying a heat-sealable polymer may include reverse-roll printing the heat-sealable polymer to form the first composite, and applying the polyurethane coating to the aliphatic polycarbonate polyurethane coating may include reverse-roll printing to form the second composite. In one or more embodiments, the printable surface may have a surface roughness of at most 50 μin. In an embodiment, the support layer may have an open structure defined by a void content of 10 to 50% by volume.

According to at least one embodiment, a heat-sealable thermoprintable tape includes a support layer having an open structure configured to support an extruded coating, an extruded thermoplastic coating disposed on a first side of the support layer and in the open structure, the extruded thermoplastic coating having a smooth printable surface, and an extruded heat-seal polymer layer disposed on a second side of the support layer, opposite the first side, and in the open structure. The extruded thermoplastic coating is bonded to the heat-seal polymer layer within the open structure of the support layer to form the heat-sealable thermoprintable tape. In one or more embodiments, the open structure of the support layer may be defined by a void content of 10 to 50% by volume. In certain embodiments, the extruded thermoplastic coating and the extruded heat-seal polymer are the same polyurethane material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities and ranges in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1A:
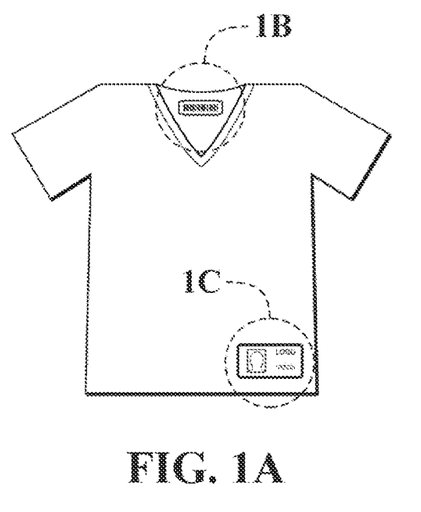
FIG. 1A is a schematic illustration of a thermoprintable tape as a label on a uniform, according to an exemplary embodiment.
Figure 1B:
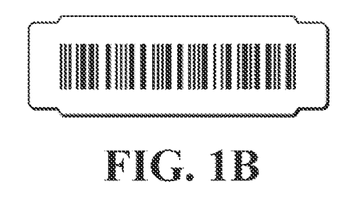
FIGS. 1B-1C are schematic illustrations of the labels of FIG. 1A, according to an exemplary embodiment.
Figure 1C:
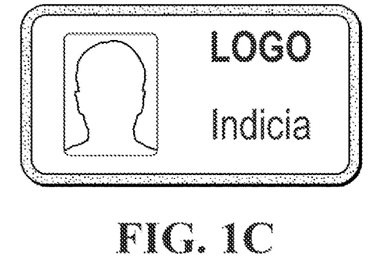

According to embodiments of the present disclosure, a heat-sealable thermoprintable tape is disclosed. The heat-sealable thermoprintable tape can be used for labelling for clothing, industrial garments, such as uniforms, gear, shoes, etc, as shown in an exemplary embodiment in FIG. 1A as a label on scrubs. As such, a smooth and durable printing surface is provided by extrusion to print readable identifiers, such as bar codes, on the tape ribbon, as shown in FIGS. 1B-C, without the need for additional processing. Furthermore, the heat-sealable thermoprintable tape adheres to various types of fabric, providing versatility in design, as well as remains adhered to the fabric without curling due to heat, and remains flexible through multiple use-cycles (e.g., washing and drying), as compared to sewn on labels.

The heat-sealable thermoprintable tape of the present disclosure includes a solid extruded film as a base coating. Although other extruded thermoplastic coatings are contemplated (e.g., cross-linked aliphatics, such as polycarbonate) by the present disclosure, a polyurethane film is described hereinafter as an example, and is not intended to be limiting. For garment washing, polyurethanes provide superior resistance to detergent and soaps when compared to other thermoplastic polymers, which may curl or degrade. The extruded film is solidified upon cooling, and a second heat-sealable film may then be extruded on the back side of the extruded polyurethane film, as shown in FIG. 2B. The polyurethane film and heat-sealable film may be extruded on to either side of a support layer, such as, for example, a scrim, as in FIG. 2A, or directly bonded during extrusion to each other, as shown in FIG. 2B. The support layer may be used in removal of the labels, but also provides structure to the labels prior to adhering to fabric uniforms.

In certain embodiments, the support layer has an open structure and is capable of supporting the film layers in the open structure such that they bond together during extrusion. The open structure allows the films to bond to create a composite tape, while extrusion provides a smooth surface for printing without calendaring or additional surface processing. The extruded layers, as compared to solution-based thermoprintable tapes, relatively lack contours of the open structure, thus providing a smooth printing surface. Smoothness of the surface may be measured by a Sheffield or Gurley test to determine if the surface is sufficiently smooth for printing. For printing of readable print, the dots forming the pattern should appear continuous, as shown in FIGS. 1B-C. Discontinuities in the surface can cause the pattern to appear broken, and thus unreadable in the exemplary embodiment of bar codes. Conventional heat-sealable thermoprintable tapes require calendaring to smooth peaks and valleys in the surface, which does not always make the surface printable. Thus, extruded layers provide a smooth printing surface such that the pattern of dots appears continuous, without the need for additional surface treatment.

The base coating of polyurethane may be coated with an aliphatic polyurethane top coat, such as a polycarbonate, to protect the tape from UV exposure and yellowing. Furthermore, a polycarbonate based polyurethane/urea aliphatic top coat provides further resistance to hydrolytic degradation. The coatings may be applied by a reverse roll operation, which allows for weight and thickness control for the coatings, thus providing a relatively smooth coating when compared to conventional coating methods.

Figure 2A:
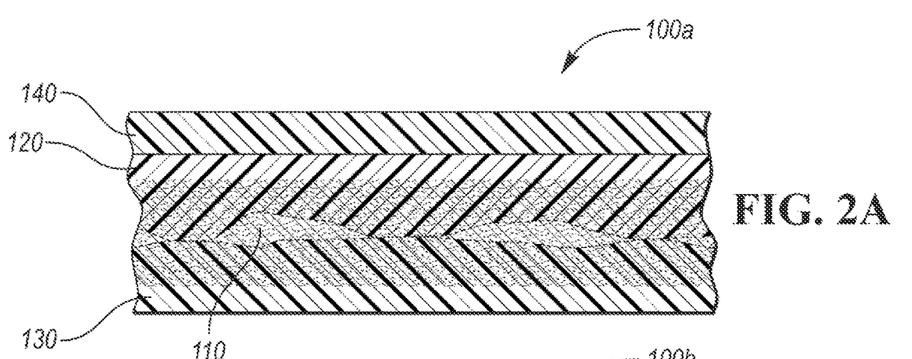
FIG. 2A is a schematic illustration of a cross-section of a thermoprintable tape, according to an embodiment.
Figure 2B:
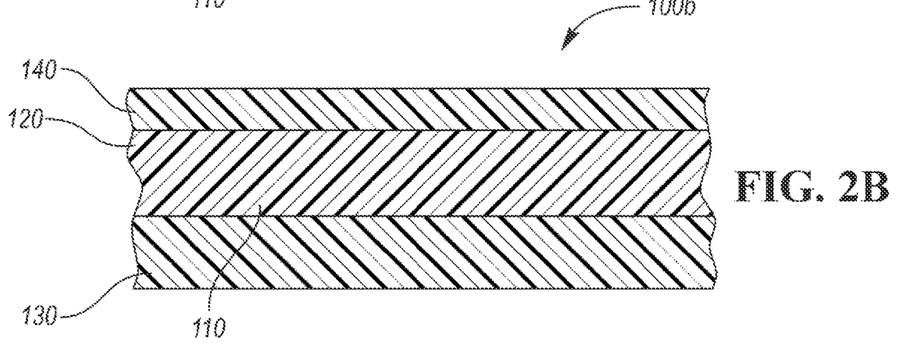
FIG. 2B is a schematic illustration of a cross-section of a thermoprintable tape, according to another embodiment.

Referring to FIG. 2A, a schematic cross-section of a heat-sealable thermoprintable tape 100, or tape 100, is shown according to an embodiment. In at least one embodiment, tape 100a includes a support layer 110 having an open structure. The support layer is a middle structural layer such as a scrim, a permeable sheet, a spun fabric, and the like. While certain embodiments are contemplated, it should be understood that the support layer is any layer capable of supporting coating layers in an open structure. In certain embodiments, the support layer 110 is a woven layer having an open weave. An open structure in a support layer is able to support an extruded coating, unlike tight knit layers required to support solvent based coatings. With an open structure in the support layer, unlike solvent based coatings which would fall through, the extruded coatings push into the voids of the open structure. Although 'scrim' is used hereinafter, it should be understood that in other embodiments, any support layer with an open structure may be contemplated by the present disclosure, and a scrim is a representative example of a support layer.

Tape 100a includes a thermoplastic coating 120 extruded onto the scrim 110. The open structure of support layer or scrim 110 allows the thermoplastic coating to push into and through the scrim during extrusion without falling through the scrim 110, and provides a smooth surface (e.g., without the weave contours) for printing upon cooling, without the use of solvents. Although coating 120 is hereinafter referred to as polyurethane coating 120, it is contemplated that any thermoplastic extrudable coating may be used to form the heat-sealable thermoprintable tape (e.g., a cross-linked aliphatic), and that certain properties (i.e., weight) may vary for different thermoplastic coatings. The thermoplastic coating 120 has a relatively strong resistance to detergent and soap. The polyurethane coating 120 (or first polyurethane coating) may be a thermoplastic polyurethane (TPU) coating, such as commercially available K-126 polyurethane, or other TPU with a similar softening point and mechanical properties. The TPU may be an aromatic TPU, produced by polymerization of a polyol with an aromatic diisocyanate, e.g. diphenyl methane diisocyanate. The Shore Hardness (Shore A) (ASTM D2240) of the polyurethane coating 120, in at least one embodiment, is 45 to 98 A, in another embodiment is 50 to 96 A, and in yet another embodiment, is 55 to 95 A. In one or more embodiments, the extruded polyurethane coating 120 has a thickness of 1 to 5 mm, in another embodiment, of 2 to 4 mm, and in yet another embodiment, of 3 mm. In at least one embodiment, the extruded polyurethane coating 120 of the tape has a weight of 100 to 180 g/m². In an embodiment, the extruded polyurethane coating has a weight of 110 to 160 g/m², and in another embodiment, of 120 to 150 g/m². In yet another embodiment, the extruded polyurethane coating has a weight of 130 g/m². The extruded polyurethane coating provides a fast and durable heat-sealed bond with a smooth surface for uses such as, but not limited to, uniform labels and bar codes.

Further, in at least one embodiment, tape 100a includes a heat-seal polymer 130 extruded onto the other side of the support layer 110, opposite from the first polyurethane coating 120. In other embodiments, as shown in FIG. 2B, the tape 100b includes a heat-seal polymer extruded directly onto the extruded polyurethane coating 120. The heat-seal polymer 130 may be a polyurethane, such as a thermoplastic polyurethane, or other suitable polyurethane. The heat-seal polymer has a chemical structure that is able to flow into the garment/uniform being labelled, and form a bond with the fibers. In at least one embodiment, the heat-seal polymer 130 may be the same polyurethane as the polyurethane coating 120. For example, both the heat-seal polymer 130 and the extruded polyurethane coating 120 may be a TPU such as, e.g., commercially available K126.

Heat-seal polymer 130 may interchangeably be referred to as the second polyurethane coating. In some embodiments, the heat-seal polymer 130 may have similar properties to the extruded polyurethane coating 120, such as, but not limited to, urethane level, degree of crystallization, hardness, softening point, and others. In other embodiments, the heat-seal polymer 130 may have different properties than the extruded polyurethane coating 120 such that, for example, the flow of the heat-seal polymer 130 is different from the extruded polyurethane coating 120, the extruded polyurethane coating 120 may be harder than the heat-seal polymer 130, or the heat-seal polymer 130 may be more crystalline than the extruded polyurethane coating 120.

In certain embodiments, as shown in FIG. 2A, heat-seal polymer 130 also pushes into the open structure of scrim 110, and a durable bond forms between the first polyurethane coating 120 and the second polyurethane coating 130 within the open weave of support layer 110. In other embodiments, as in the embodiment of tape 100b shown in FIG. 2B, the second polyurethane coating 130 bonds directly to the first polyurethane coating 120 without a support layer. In one or more embodiments, the heat-seal polymer 130 has a thickness of 1 to 5 mm, in another embodiment of 2 to 4 mm, and in yet another embodiment, of 3 mm. In at least one embodiment, the heat-seal polymer has a weight of 50 to 150 g/m². In an embodiment, the heat-seal polymer has a weight of 75 to 125 g/m², and in another embodiment, a weight of 90 to 110 g/m². In yet another embodiment, the heat-seal polymer has a weight of 100 g/m². The coating weight of the heat-seal polymer 130 and the shore and/or durometer of urethane provides thermoprintable and smoothness properties to the tape 100a when used in offset printing or inkjet printing, even when used without a top-coat. In some embodiments, the heat-seal polymer 130 may further include a wax component with the polyurethane prior to extrusion. The wax component lubricates the heat-seal polymer 130 during the extrusion process. Either the first polyurethane coating 120 or heat-seal polymer 130, or both, may include other additives including, but not limited to, flame retardants, titanium dioxide, silica, or other additives.

Referring again to FIGS. 2A and 2B, the tape 100a, 100b in certain embodiments further includes a top coat 140 having aliphatic properties on top of the polyurethane coating 120. In some embodiments, the top coat 140 provides UV resistance such that it prevents the tape from yellowing due to water sublimation or from exposure to UV rays, as well as resistance to hydrolysis during multiple washes. The top coat 140 may be, for example, an aromatic polycarbonate, a white aliphatic polycarbonate, an aliphatic polyurea, an aliphatic polyurethane, an aliphatic polyester, an aliphatic polyether, or blends thereof. In certain embodiments, the top coat 140 may be a solvent coating. As a non-limiting example, when the top coat 140 is a white polycarbonate top coat, the top coat 140 proves UV resistance as well as hydrolytic stability to the tape 100. In at least one embodiment, top coat 140 has a weight of 10 to 30 g/m². In other embodiments, the top coat 140 has a weight of 15 to 20 g/m², and yet another embodiment, 17 g/m². The thickness of the top coat 140 may be, in at least one embodiment, 0.25 to 3 mm, in another embodiment, 0.5 to 2.5 mm, and in yet another embodiment 1 to 2 mm.

The top coat 140 is generally referred to hereinafter as an aliphatic polycarbonate. The top coat 140 may be applied to the polyurethane coating 120 by a gravure coater or via a reverse roll application. When applied via a reverse roll application, the top coat 140 is smooth and the thickness and weight of the coating can be better controlled when compared with other application processes. As such, the reverse roll printing can provide a uniform and defect free surface for printing. The top coat 140 is applied, in at least one embodiment, at 20 to 40 g/m², in some embodiments, is applied at 25 to 35 g/m², and in yet other embodiments, is applied at 27 to 33 g/m². Top coat 140 may be solvent based or aromatic, creating a bond with the polyurethane coating 120 as it is applied as a wet solvent or paint lacquer. In some embodiments, the polyurethane coating 120 and/or the top coat 140 may include cross-linkers to chemically bond the polyurethane coating 120 and the top coat 140. When the top coat 140 is a solvent based coating, the tape 100a may be dried after application to evaporate solvents and leave behind a durable, printable, and cured polycarbonate surface on the extruded film. Because of the open structure, the polyurethane coating 120 is able to push into the support layer 110 without falling through and bond to the heat-seal polymer, and the extrusion of the polyurethane coating provides a smooth printing surface, void of any of the support layer contours, which can then be coated with the top coat 140 to form a printable surface with improved ink adhesion. The extruded surface is printable without the need for calendaring or other surface processing.

The smoothness of the surface of the heat sealable-thermoprintable tape is measured using a measure of surface roughness (ASME B46.1) by a profilometer (or Sheffield Instrument). As the printable surface of the tape is smoother than conventional tapes, the surface roughness of the tape is lower than that of conventional tapes. In one or more embodiments, the surface roughness ($R_a$) of the heat-sealable thermoprintable tape is at most 50 μm. In another embodiment, the surface roughness ($R_a$) of the surface of the heat-sealable thermoprintable tape is 10 to 50 μm, and in yet another embodiment, the surface roughness is 10 to 40 μin.

In one or more embodiments, the heat sealable thermoprintable tape has a pull strength of 30 to 50 lbs/in² as measured by a pull test (ASTM D1876). In an embodiment, the pull strength of the thermoprintable tape is 35 to 45 lbs/in², and in another embodiment, is 37 to 42 lbs/in². In yet another embodiment, the pull test strength of the heat-sealable thermoprintable tape of 40 lbs/in². The pull test shows how well the tape adheres to a garment after being applied via heat application, illustrating the bond between the polyurethane coating/heat-seal polymer and the garment fibers. Because the scrim is coated with urethane on both sides, the pull adhesion is greatly improved compared to conventional heat sealable thermoprintable tapes (having a pull test of 7 lbs/in²) because the polyester scrim is coated all the way around and through the polyester scrim.

According to at least one embodiment, the tape has a total weight of 200 to 300 g/m². In some embodiments the tape has a total weight of 215 to 285 g/m², and in other embodiments, has a total weight of 225 to 275 g/m². In yet another embodiment, the tape has a total weight of 240 to 265 g/m². In an embodiment, the tape has a total weight of 260 g/m². With respect to the thickness of the tape, the total thickness of the tape in at least one embodiment is 3 to 12 mm. In other embodiments, the thickness of the tape is 5 to 10 mm, and in yet another embodiment 8 mm.

Referring again to FIG. 2A, in certain embodiments, the support layer 110 may be a scrim. The scrim having an open structure includes a higher void content than tight knit conventional scrims. In at least one embodiment, the scrim 110 may be a polyester scrim, a nylon scrim, a cotton scrim, or a blend thereof. Scrim 110 may be 50% to 100% polyester. In some embodiments, the scrim 110 is 80% to 100% polyester. The woven scrim 110 is not sensitive to heat, does not have propensity to curl during washes, and securely adheres to fabric, when compared to conventional fabric scrims for heat-sealable tapes (such as nylon, which is sensitive to moisture and only adheres to other nylon articles). The voids of the open structure of scrim 110 may be formed by the thread count of the scrim. In certain embodiments, the thread count is 75 to 200 for a scrim having a construction with 64 ends, and in other embodiments the thread count is 150 to 200 for a scrim having 54 ends. The strands of the scrim 110 have a linear mass density of fibers of 60×60 to 80×80 denier. For example, in some embodiments, the scrim 110 has a linear mass density of fibers of 68×68 to 72×72 denier. In yet another embodiment, the scrim 110 has a linear mass density of fibers of 70×70 denier. Further, the scrim 110 has a thickness of 1 to 5 mm. In some embodiments, the scrim 110 has a thickness of 3 mm. The scrim has a cross weave of 120 to 160. In some embodiments, the scrim has a cross weave of 140. The scrim 110 shows 1 to 3 oz/yd². In some embodiments, the scrim 110 shows 1.25 oz/yd² to 2.55 oz/yd². In yet another embodiment, the scrim 110 shows 1.45 oz/yd². In at least one embodiment, the weight of scrim 110 is 20 to 70 gsm, and in some embodiments, is 25 to 55 gsm. In yet another embodiment, the weight of scrim 110 is 30 gsm. Scrim 110 includes individual threads or strands wound 15 to 25 times per lineal inch, and in some embodiments, 18 to 20 times per lineal inch, to provide stiffness at the nip point during extrusion out of a hot die at about 400° F. Furthermore, in at least one embodiment, scrim 110 has a void content of 10% to 50% by volume. In some embodiments, the scrim 110 has a void content of 12% to 40% by volume. In yet another embodiment, the scrim 110 has a void content of 15 to 30% by volume.

Figure 3:
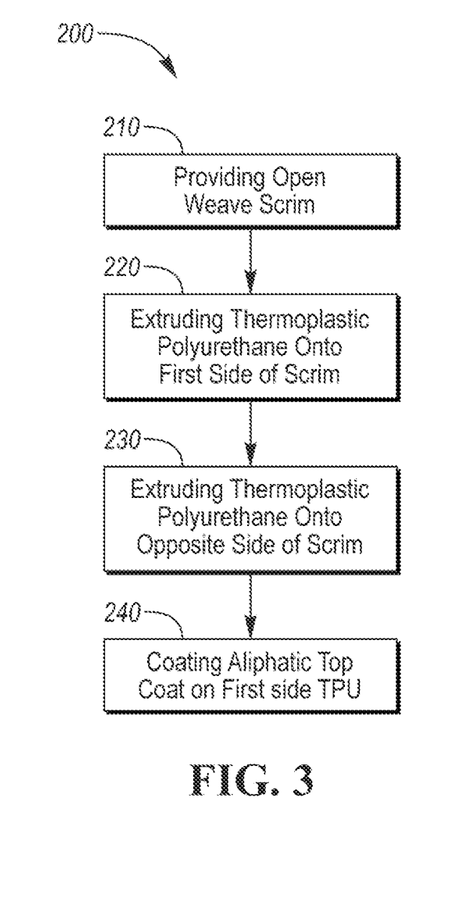
FIG. 3 is a flow chart of an extrusion process for forming a thermoprintable tape, according to an embodiment.

According to one or more embodiments, an exemplary method of forming a heat-sealable thermoprintable tape is disclosed. Referring to FIG. 3, the method 200 includes, at step 210, providing a support layer, e.g. an open weave scrim. According to an embodiment, the scrim has a density of 68 to 72 denier and a thickness of 3 mm. The woven scrim has an open structure configured to support an extruded coating. Next, at step 220, a polyurethane coating is extruded onto a first side of the scrim and into the open weave to form a top surface which is smooth for printing.

Due to the open weave nature of the scrim, the polyurethane is able to push into the scrim during extrusion, thus forming a smooth top surface. Further, at step 230, a heat-sealable polymer (or second polyurethane coating) is extruded onto a second side of the scrim opposite the first side and into the open weave such that the polyurethane coating bonds to the heat-sealable polymer within the open weave of the scrim. The heat-sealable polymer pushes into the open weave of the scrim to form the bond with the polyurethane coating within the scrim from the opposite side. At step 240, an aliphatic top coat, such as a polycarbonate, is applied to the top surface, to provide a smooth printable surface with UV resistance. The aliphatic top coat can be applied via a reverse roll process or a gravure coater.

Figure 4:
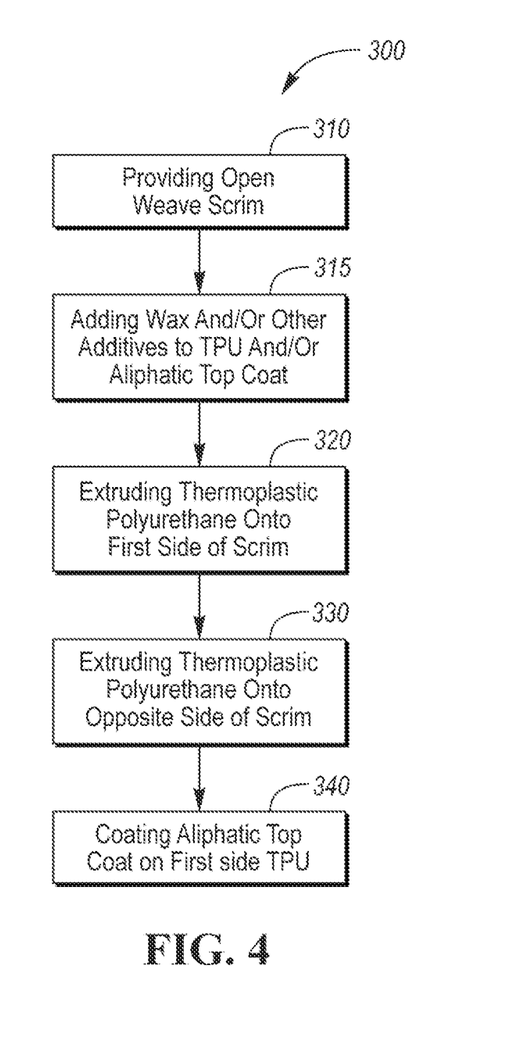
FIG. 4 is flow chart of an extrusion process for forming a thermoprintable tape, according to another embodiment.

Referring to FIG. 4, a method of forming a heat-sealable thermoprintable tape is disclosed according to yet another embodiment. The method 300 includes, at step 310, providing a support layer, e.g. an open weave scrim. According to another embodiment, the scrim has a density of 68 to 72 denier and a thickness of 3 mm. The woven scrim has an open weave configured to support an extruded coating. At step 310, a wax component is added to a polyurethane coating to lubricate the polyurethane during the extrusion process. Next, at step 320, the polyurethane coating is extruded onto a first side of the scrim and into the open weave to form a top surface which is smooth for printing. Due to the open weave nature of the scrim, the polyurethane is able to push into the scrim during extrusion, thus forming a smooth top surface. Further, at step 330, a heat-sealable polymer (or second polyurethane coating) is extruded onto a second side of the scrim opposite the first side and into the open weave such that the polyurethane coating bonds to the heat-sealable polymer within the open weave of the scrim. The heat-sealable polymer pushes into the open weave of the scrim to form the bond with the polyurethane coating within the scrim from the opposite side. At step 340, an aliphatic top coat, such as a polycarbonate, is applied to the top surface, to provide a smooth printable surface with UV resistance. The aliphatic top coat can be applied via a reverse roll process or a gravure coater.

Although in FIGS. 3 and 4, the methods are shown as extruding onto the support layer, it is contemplated that the layers may be extruded onto each other directly, as in the embodiment of FIG. 2B, such that the coatings bond directly with each other, as opposed to within the support layer. According to an embodiment, the first thermoplastic layer is extruded, and subsequently the heat-seal polymer is extruded onto the thermoplastic layer, or vice versa. The thermoplastic layer thus has a smooth printing surface, that can further be coated with an aliphatic polycarbonate top coat.

In an embodiment, the TPU coatings may be dissolved in solvents. For example, aromatic TPU coatings are typically soluble in solvents such as, but not limited to, blends of methyl-ethyl ketone and toluene. The aliphatic polycarbonate top coat is typically soluble in solvents such as, but not limited to, blends of isopropanol and toluene. When the coatings are dissolved in solvents, the coating operation may be performed in a reverse roll printing operation. Reverse roll printing yields a tape with desirable weight characteristics because of controlled coating thickness and improved smoothness of the printable surface. In embodiments where the TPU coatings are dissolved in solvents, the scrim may include a tighter weave fabric construction. As in the embodiment of FIG. 2, the scrim is coated with the aromatic TPU heat-seal polymer in solution, such that the surface of the scrim is sealed, and the opposite surface of the scrim is coated with the polyurethane coating (or base-coat TPU) in solution. The aliphatic top coat, such as a polycarbonate, is then applied to the base coat TPU. In a refinement, the heat-seal polymer is first extruded onto the scrim, and then the coated scrim is sent to the reverse roll printer for applying the base coat TPU and top coat polycarbonate.

Figure 5A:
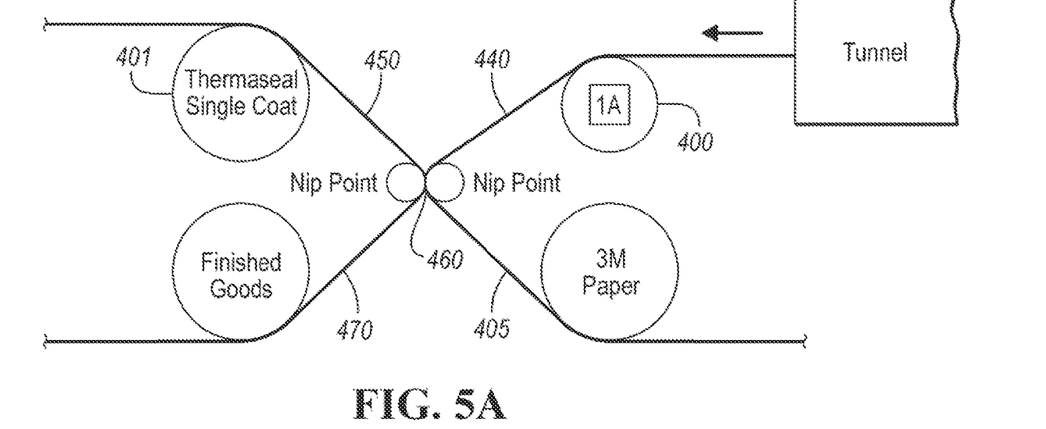
FIG. 5A shows a schematic process diagram for forming a thermoprintable tape, according to yet another embodiment.
Figure 5B:
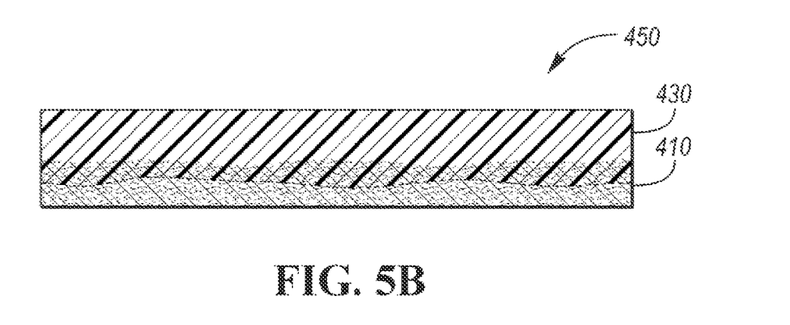
FIG. 5B shows a schematic illustration of a cross-section of a starting component of the process of FIG. 5A.
Figure 5C:
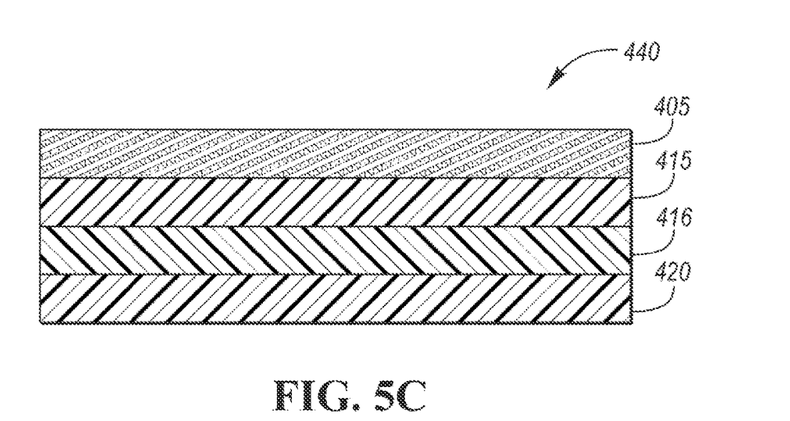
FIG. 5C shows a schematic illustration of a cross-section of another starting component of the process of FIG. 5A.

Referring to FIGS. 5A-C, a process diagram and components for forming a heat-sealable thermoprintable tape is shown according to another embodiment. In FIG. 5A, a release paper 405 (or releasable paper), with an aromatic thermoplastic urethane coating 415 extruded onto the release paper 405, is provided exiting tunnel 406 as part of a first operation 400. The aromatic thermoplastic urethane (TPU) coating is a polycarbonate TPU. A polyurethane coating 420 is also extruded on to coating 415 at, to form the composite 440, as shown in FIG. 5C. The polyurethane coating may be a base coating such as a TPU coating, such as commercially available K-126 polyurethane. The TPU may be an aromatic TPU. Although in FIG. 5C, two polycarbonate white coat layers are shown, 415, 416, there may be only one or any number of polycarbonate coatings based on the desired thickness and linkage. Composite 440 is provided to a nip-roll operation 460. In a separate operation 401, a heat seal polymer 430 is extruded onto one side of a support layer 410 to form another composite 450. The composite 450 of the support layer 410 and heat-seal polymer 430 is shown in FIG. 5B. The heat-seal polymer 430 may be a polyurethane, such as a thermoplastic polyurethane. In a third operation 402, the composite 450 is passed through a heated nip roller 460, such that the scrim composite 450 and the coated release paper 440 are joined by heat and pressure at the nip point to form thermoprintable tape 470. Through the heated nip roller 460, the polyurethane coating 420 from the first operation 400 is pushed into the other side of the scrim 410 from the heat-seal polymer 430, such that the polyurethane coating 420 and the heat-seal polymer 430 form a durable bond within the support layer 410. The thermoprintable tape 470 may be separated from the release paper 405 after the nip rolling process. Although the release paper 405 is shown in FIG. 5A as being removed from the tape 470 after nip-rolling, the release paper may be removed later in the process, or left on the tape for removal after the point of sale.

According to embodiments of the present disclosure, a heat-sealable thermoprintable tape is disclosed. The heat-sealable thermoprintable tape includes a solid thermoplastic film extruded on a support layer such that a heat-sealable film extruded on the opposite side of the scrim can bond with the thermoplastic film within the support layer. In another embodiment, the solid thermoplastic film and heat-sealable film are extruded directly onto each other, such that they are directly bonded without the need of a support layer. The open structure of the support layer allows the films to push into the scrim during extrusion, resulting in a strong bond between the coatings. In one or more embodiments, the thermoplastic film, the heat-sealable film, or both, are a polyurethane material. The extrusion provides a smooth surface for printing without the need of calendaring or additional processing to smoothen the surface. The thermoplastic coating may further be coated with a polycarbonate top coat to provide aliphatic properties to prevent the tape from yellowing.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A heat-sealable thermoprintable tape for bonding to a fabric, the tape comprising:
   an extruded thermoplastic polyurethane coating having a smooth surface on a first side;
   a top-coat layer on the smooth surface, the top-coat layer being bonded to the extruded thermoplastic polyurethane coating; and
   an extruded heat-sealable polymer layer disposed on and bonded to a second side of the extruded thermoplastic polyurethane coating, opposite the first side, the extruded heat-sealable polymer layer having a top side directly contacting the second side of the extruded thermoplastic polyurethane coating and a bottom side that is directly bondable to and embeddable into the fabric without any interposing layers therebetween upon application via a heat-seal process; and a support layer between the extruded thermoplastic coating and the extruded heat-seal polymer layer, the support layer having an open structure, and the extruded thermoplastic coating and heat-sealable polymer are bonded within the open structure of the support layer,
   wherein the extruded thermoplastic polyurethane coating and top-coat layer cooperate to form the thermoprintable tape having a printable surface.

2. The heat-sealable thermoprintable tape of claim 1, wherein the printable surface has a surface roughness (RA) of at most 50 μin as measured by a profilometer.

3. The heat-sealable thermoprintable tape of claim 1, wherein the printable surface has a surface roughness is 10 to 40 μin as measured by a profilometer.

4. The heat-sealable thermoprintable tape of claim 1, wherein the extruded thermoplastic coating has a Shore Hardness of 45 to 98 A.

5. The heat-sealable thermoprintable tape of claim 1, wherein the open structure of the support layer is defined by a void content of 10 to 50% by volume.

6. The heat-sealable thermoprintable tape of claim 5, wherein the support layer is a polyester scrim having a thread count of 150 to 200.

7. The heat-sealable thermoprintable tape of claim 5, wherein the scrim is a polyester scrim.

8. The heat-sealable thermoprintable tape of claim 1, wherein the top-coat layer is bonded to the extruded thermoplastic coating without any interposing layers therebetween.

9. The heat-sealable thermoprintable tape of claim 1, wherein the extruded thermoplastic coating and the extruded heat-sealable polymer are made of the same polyurethane material.

10. The heat-sealable thermoprintable tape of claim 1, wherein the top-coat layer is an aliphatic polycarbonate polyurethane top coat layer.

11. The heat-sealable thermoprintable tape of claim 1, wherein the heat-sealable thermoprintable tape is heat sealable to the fabric such that a bottom surface of the heat-sealable polymer layer, opposite the top surface, is embeddable into and bondable with the fabric, and the heat-sealable thermoprintable tape has a pull strength of 30 to 50 lbs/in$^2$ when the heat-sealable thermoprintable tape is bonded to the fabric as measured according to ASTM D1876.

12. A method of forming a heat-sealable thermoprintable tape bondable to a fabric, the method comprising:
   providing a support layer having an open structure configured to support an extruded coating;
   applying a polyurethane coating onto a first side of the support layer and into open spaces of the open structure to form a top surface;
   applying a top-coat layer on the top surface to form a printing surface; and
   extruding a heat-sealable polymer onto a second side of the support layer opposite the first side and into the open spaces of the open structure such that the polyurethane coating bonds to the heat-sealable polymer within the open structure of the support layer to form a tape, the heat-sealable polymer having a top side directly bonded to the polyurethane coating and a bottom side opposite the top side,
   wherein upon application of the tape to the fabric via a heat-seal process, the bottom side of the heat-sealable polymer is bondable and embeddable into the fabric.

13. The method of claim 12, wherein applying the top-coat layer includes gravure coating an aliphatic coating.

14. The method of claim 12, wherein applying the polyurethane coating includes reverse-roll printing the polyurethane coating.

15. The method of claim 12, wherein the open structure of the support layer is defined by a void content of 10 to 50% by volume.

16. The method of claim 12, wherein the printing surface has a surface roughness (RA) of at most 50 μin as measured by a profilometer.

17. A method of forming a heat-sealable thermoprintable tape comprising:
   applying a heat-sealable polymer on to a support layer having an open structure to form a first composite, the heat-sealable polymer having a top side within the open structure of the support layer and a bottom side opposite the top side on a first releasable paper;
   applying an aliphatic coating to a second releasable paper;
   applying a polyurethane coating directly on to the aliphatic coating on the second releasable paper to form a second composite; and
   bonding the top side of the heat-sealable polymer of the first composite directly to the polyurethane coating of the second composite within the open structure of the support layer with heat and pressure to form the heat-sealable thermoprintable tape having a printable surface,
   wherein the heat-sealable thermoprintable tape is applicable to a substrate by removing the first releasable paper and bonding the bottom side of the heat-sealable polymer to the substrate via a heat-seal process, and indicia can be printed on the printable surface after removing the second releasable paper.

18. The method of claim 17, wherein the printing surface has a surface roughness (RA) of at most 50 μin as measured by a profilometer.

19. The method of claim 17, wherein the applying of the polyurethane coating includes chemically bonding the aliphatic coating to the polyurethane coating via a cross-linker in one or both of the polyurethane coating and the aliphatic polycarbonate polyurethane coating.

* * * * *